Figure 1:
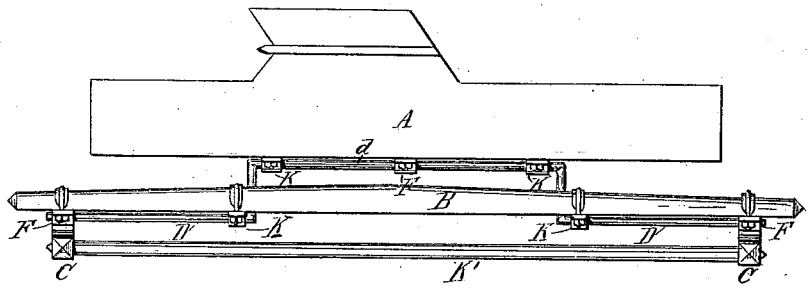

M. L. GARDNER.
VEHICLE SPRING.

No. 244,044.

Patented July 12, 1881.

Witnesses:
Chas. J. Buchheit
Edw. J. Brady

Inventor:
Myron L. Gardner
By Theodore F. Will
Attorney.

UNITED STATES PATENT OFFICE.

MYRON L. GARDNER, OF FAIRVIEW, PENNSYLVANIA.

VEHICLE-SPRING.

SPECIFICATION forming part of Letters Patent No. 244,044, dated July 12, 1881.

Application filed June 6, 1878.

*To all whom it may concern:*

Be it known that I, MYRON L. GARDNER, of the village of Fairview, county of Erie, and State of Pennsylvania, have invented certain new and useful Improvements in Springs especially for Vehicles, of which the following is a full, clear, and exact description, reference being had to the accompanying drawings, which form a part of this specification.

My invention consists in a novel construction, form, and arrangement of torsion-springs especially for vehicles, and particularly adapted to side-bar vehicles, and a novel method of attaching the same, whereby simple and effective springs are obtained at small expense and a strong and durable vehicle produced.

In carrying out my invention I construct double torsion-springs from two straight bars or rods of elastic steel by rigidly attaching to one end of each rod an arm or lever, uniting the two rods, so that the rods shall be parallel to each other, or nearly so, and the arm usually at, or nearly at, right angles with the rods. The arm may be made separately and rigidly attached at its ends to the ends of the rods or springs in any suitable manner, or it may be made from the same rod as the springs by bending the rod into the desired form. Another form of the spring is made by attaching the lever-arm at its ends to the centers of the torsion rods or bars. The size of the rod may be varied to suit the purpose for which the spring is intended, the stiffness required, the weight to be sustained, or the style of the vehicle. One rod of the double spring thus formed is attached to the side bar of the vehicle, so that it shall be parallel to it and on the under side, or it may be on the inner or upper side; and the other rod is attached to the bottom of the body of the vehicle and parallel to the side. The arm or lever extends inward from the side bar to the bottom of the body. Two double springs are thus attached to each side bar and the corresponding side of the bottom of the body, making four in all; but more may be used, if desired. The springs are fastened to the side bars and body by box clips or sockets, one at each end of each rod. The clips or sockets at those ends of the rods to which the arm or lever is attached allow the rods to turn freely therein on their longitudinal axis, but prevent any other motion, while those at the other ends of the rods hold them immovably. The arms are made of a suitable length, usually from six to ten inches, and can be varied in shape so that the bottom of the body in its normal position can be either higher or lower than the side bars or on a level with them. The arms are also so formed and attached as to allow the body to move upward or downward through a considerable space. It is evident that when the body is pressed down by any weight it moves the arms in such a manner as to cause a twist in the rods or springs, and the power of the springs lies in their resistance to this torsion.

I am aware that torsion-springs similar to a certain extent to those herein described have been patented and used heretofore; but my invention differs from them all in form, construction, and arrangement in having a double spring with one rod attached to the side bar or other parts of the running-gear and one to the body, and the two connected by a continuous lever or arm common and rigidly attached to each rod or spring and acting as a lever for both, and not attached directly to the side bar, body, or other part of the vehicle, all of which may be made in one piece, and also in greater simplicity and cheapness of construction, and in greater ease and effectiveness as a spring.

My invention is more fully explained by reference to the accompanying drawings, forming a part of this specification.

In each figure of these drawings A is the body of the vehicle, which may be of any ordinary construction. B B are the side bars, and C C the end bars or elliptic half-springs, or the axles and head-blocks.

Figure 2:
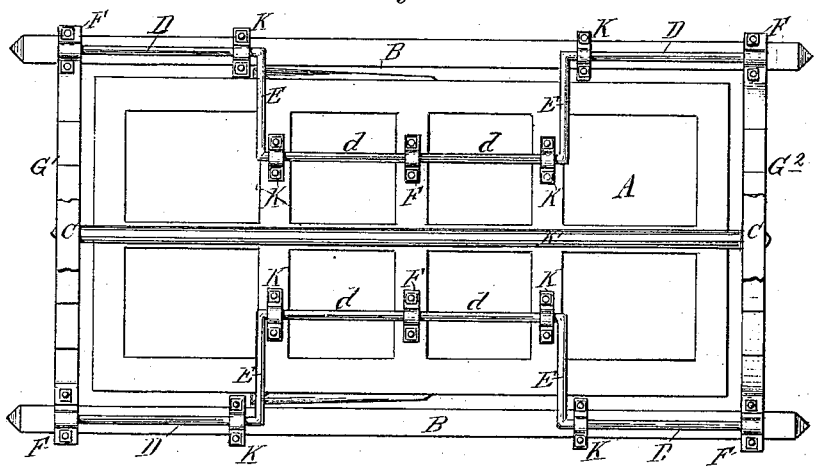
Figure 3:
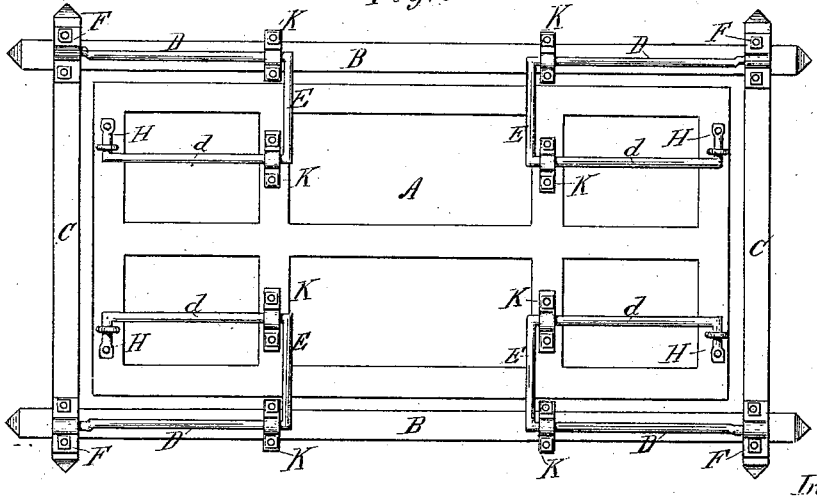

Figure 1 is a side view of the vehicle-body, side bars, and springs; and Figs. 2 and 3 bottom views of the same. Figs. 2 and 3 show my invention in equivalent modifications. Fig. 1 is a side view of the form shown in Fig. 2.

In all the figures corresponding parts are indicated by the same letter.

In Figs. 2 and 3 D D *d d* are the torsion rods or springs. The rods D D are attached at their ends to the ends of the side bars, B B, by the box clips or sockets F F, and the rods *d d* are attached at their ends to the bottom of the body A by the box clips or sockets F F or hook-bolts and staples H H. The clips or sockets F F have square or angular depressions or holes, into which the ends of the rods D D *d d*, correspondingly shaped, are fitted, whereby they are held immovably. Instead of the clips or sockets F F, the immovable ends of the rods *d d* may be attached to the bottom of the body A by bending the end of the rod at an angle and fastening to the body by hook-bolts or staples H H, Fig. 3, or in any other suitable manner. The other ends of the rods D D *d d*—the ends next to the arms E E—are attached to the body A and side bars, B B, by box clips or sockets K K, which have a round hole or depression, through which the rods D D *d d* pass at their ends, whereby the rods are allowed to turn freely on their axes, but are allowed no other motion, or very little.

E E are the arms or levers, which are rigidly attached at each end to the movable ends of the springs or rods D D *d d*. These arms are slightly curved, so as to allow a greater upward and downward movement of the body.

When the end bars are placed under the side bars, as shown in Fig. 3, the rods D D, in order to be fastened by the clips or sockets F F at the end of the side bars, are slightly bent at their ends, so that these ends are held under the end bars by the clips or sockets. This bend in the rods is so short in practice as not to affect their torsional action; but the rods can be fastened to the side bars at this point in any other suitable manner.

When semi-elliptic springs C C are used instead of end bars, as in Fig. 2, the ends of the semi-elliptic springs and the ends of the torsion-rods D D are fastened to the ends of the side bars, B B, by a single box clip or socket, F F, or in any other suitable manner.

In Fig. 3 the rods D D *d d* extend from the ends of the side bars and body, respectively, toward the centers. This position may be reversed, leaving the arms E E in the same position, by having the rods extend from the centers of the side bars and body toward their ends, and a similar reversal of the positions of the rods might be made with the form shown in Fig. 2; but an important advantage is gained by having the ends of the rods D D which are fastened immovably come at the ends of the side bars, B B, where they are braced and supported by the end bars or semi-elliptic springs, as shown in the figures, instead of at the center of the side bars, where they are unsupported, because it prevents the twisting of the side bar, which would otherwise result from the torsional action of the rods D D.

The springs shown in Fig. 2 on each side of the vehicle may be made in one rod, or they may be divided at the center F on the body and the ends fastened by a single clip or socket or by separate ones.

In all cases the arms may be made separately and rigidly attached to the ends of the rods or springs, or they may be made from the same rods as the springs by simply bending them into the desired form, thereby securing greater simplicity and cheapness of construction.

What I claim as new, and desire to secure by Letters Patent, is—

1. A double torsion-spring consisting of two parallel torsion rods or springs connected by a lever-arm common to both springs, substantially as described.

2. A double torsion-spring formed of two parallel torsion rods or springs, connected by a lever-arm common to both springs, said springs being connected, respectively, to the side bar and to the body of the vehicle, substantially as described.

3. A double torsion-spring formed of two parallel torsion rods or springs and a lever-arm common to both springs, said springs being connected rigidly at one end and loosely at the other to the body and side bar of the vehicle, respectively, and with the lever-arm projecting from the loosely-connected ends, substantially as described.

4. The combination, with the body and side bar of a side-bar vehicle, of a double torsion-spring formed of two parallel torsion rods or springs, and a lever-arm common to both springs, the said springs being connected one with the body and the other with the side bar, substantially as described.

5. The combination, with the body and side bars of a side-bar vehicle, of double torsion-springs formed each of two parallel torsion rods or springs, and a lever-arm common to both springs, the said springs being connected rigidly at one end and loosely at the other to the body and side bars, respectively, and with the lever-arm projecting from the loosely-connected ends, substantially as described.

6. The combination, with the body, side bars, and semi-elliptic springs of a side-bar wagon, of double torsion-springs formed each of two parallel torsion rods or springs, and a lever-arm common to both springs, the said torsion-rods being connected one with the body and the other with the side bar, and the side bars being connected with the semi-elliptic springs, substantially as described.

7. The combination, with the body, side bar, and semi-elliptic spring of a side-bar vehicle, of a double torsion-spring formed of two parallel torsion rods or springs, and a lever-arm common to both springs, said springs being connected rigidly at one end and loosely at the other to the body and side bar, respectively, with the lever-arm projecting from the loosely-connected ends, and the side bar being connected with the semi-elliptic spring, substantially as described.

8. The combination, with the body, the side bars, the axle or bolster, and the semi-elliptic springs of a side-bar wagon, of double torsion-springs formed each of two parallel torsion rods or springs, and a lever-arm common to both springs, the said double torsion-springs being connected with the body and side bars, and the semi-elliptic springs with the side bars and axle or bolster, substantially as described.

9. The combination, with the body and side bar of a side-bar vehicle, of a double torsion-spring formed of two parallel torsion rods or springs, and a lever-arm common to both springs, said springs being connected rigidly at one end and loosely at the other to the body and side bar, respectively, with the lever-arm projecting from the loosely-connected ends, and with the rigid attachment of the spring connected with the side bar placed at the end of the side bar, where it is braced by the end bar or semi-elliptic spring, thereby avoiding all twisting of the side bar, substantially as described.

MYRON L. GARDNER.

Witnesses:
JOHN O'HARA, Jr.,
F. L. BARNET.